United States Patent
Levy et al.

(10) Patent No.: US 6,462,486 B1
(45) Date of Patent: Oct. 8, 2002

(54) METHOD FOR CONTROLLING A STRUCTURE COMPRISING A SOURCE OF FIELD EMITTING ELECTRONS

(75) Inventors: François Levy, Cláix; Denis Sarrasin, Sassenage, both of (FR)

(73) Assignee: Commissariat a l'Energie Atomique (FR)

( * ) Notice: Subject to any disclaimer, the term of this patent is extended or adjusted under 35 U.S.C. 154(b) by 0 days.

(21) Appl. No.: 09/869,099
(22) PCT Filed: Oct. 27, 2000
(86) PCT No.: PCT/FR00/03005

§ 371 (c)(1),
(2), (4) Date: Jun. 22, 2001

(87) PCT Pub. No.: WO01/31672

PCT Pub. Date: May 3, 2001

(30) Foreign Application Priority Data

Oct. 28, 1999 (FR) .............................................. 99 13499

(51) Int. Cl.[7] .................................................. H01J 29/70
(52) U.S. Cl. ..................... 315/366; 313/495; 315/169.2
(58) Field of Search ............................. 315/169.1–169.4, 315/382, 350, 366, 309; 313/495, 306, 351

(56) References Cited

U.S. PATENT DOCUMENTS 5,543,691 A    8/1996  Palevsky et al. ............ 315/366
5,847,504 A  * 12/1998  Baldi .......................... 313/495
5,856,812 A  *  1/1999  Hush et al. .................... 345/74

FOREIGN PATENT DOCUMENTS

| EP | 0 376 825 A1 | 12/1989 | ............ H01J/1/30 |
| EP | 0 660 368 A1 | 12/1994 | ............ H01J/31/12 |
| EP | 0817 232 A1  | 1/1998  | ............ H01J/9/50 |
| FR | 2 735 266    | 12/1996 | ............ G09G/3/20 |

* cited by examiner

*Primary Examiner*—Don Wong
*Assistant Examiner*—Wilson Lee
(74) *Attorney, Agent, or Firm*—Hayes Soloway, P.C.

(57) ABSTRACT

The invention relates to a control process for a structure with field effect elements, the structure comprising a cathode (1) equipped with field effect elements, an anode (2), an extraction grid (7) and an additional grid (14). The process comprises at least one phase in which electrons are emitted to the anode by field effect elements, and at least one regeneration phase during which the electrons output from the elements are not transmitted to the anode. The regeneration phase is implemented by applying an electron blocking voltage (VB) to the additional grid (14) such that electrons drop back to the cathode.

The invention is applicable to flat image display screens and any device comprising a field effect cathode (x-ray tube, etc.).

9 Claims, 2 Drawing Sheets

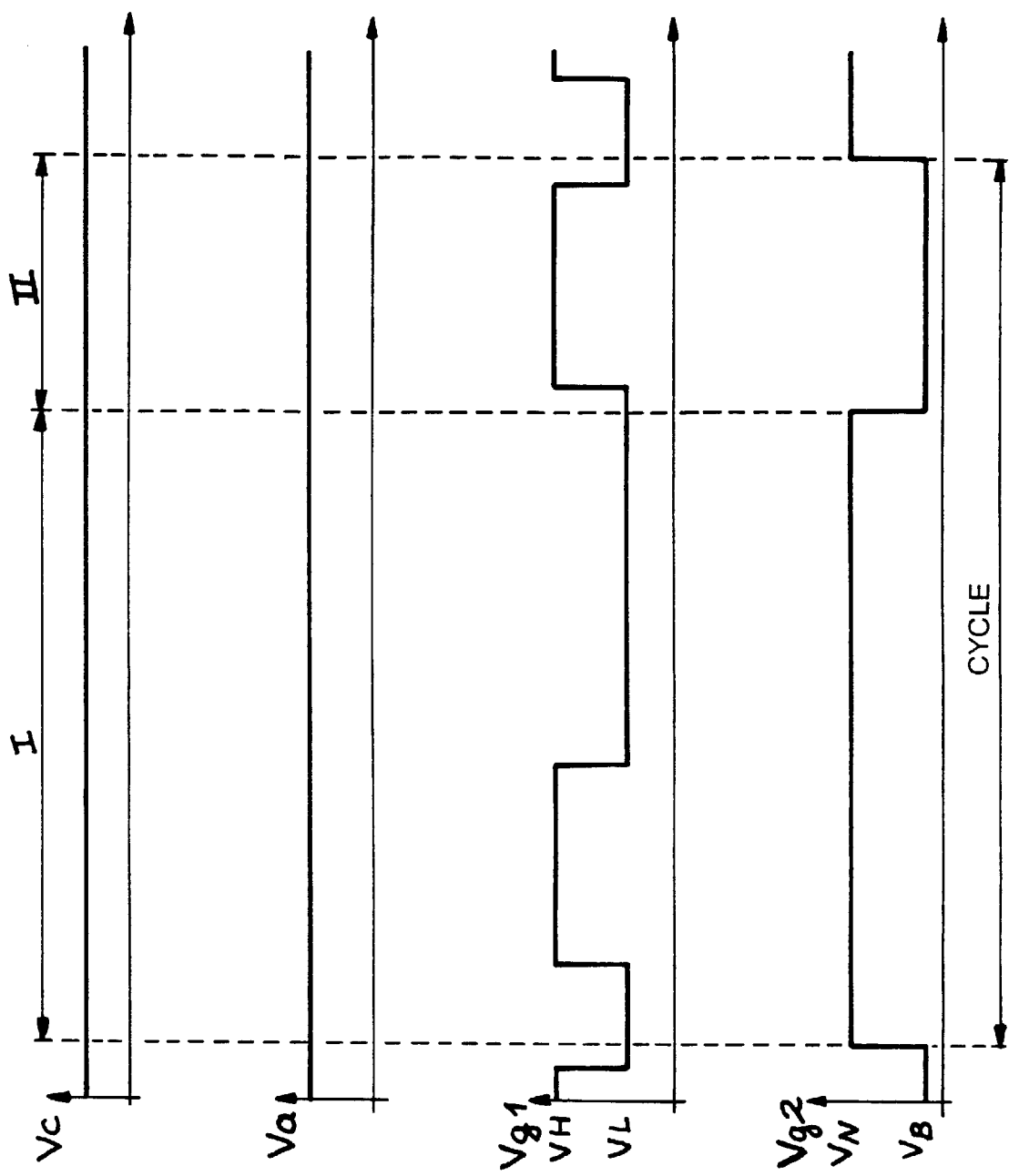

METHOD FOR CONTROLLING A STRUCTURE COMPRISING A SOURCE OF FIELD EMITTING ELECTRONS

TECHNICAL DOMAIN AND PRIOR ART

The invention relates to a structure control process comprising a field effect electron source.

A field effect electron source is usually in the form of several microprobes or studs, that are used as electron guns.

The microprobes, or studs may be aimed towards an acceleration anode lined with a luminescent material. This material emits visible light that can be used for display, in response to the electrons.

The microprobes, or studs, may also be aimed towards an anode equipped with a material capable of emitting x radiation in response to excitation of electrons.

Thus, the invention has applications for the manufacture of display devices for flat display screens and in the manufacture of X-ray tubes or any other device comprising an electron source comprising field effect elements (microprobes, studs, etc.).

Throughout the rest of the description, the example of a display screen using a microprobe source will be used in most cases for simplification reasons. However, and more generally, the invention is also applicable to any structure using a field effect electron source.

FIG. 1 shows a cross sectional view of a display screen with microprobes according to known art. For simplification reasons, only a few aligned microprobes have been shown. The screen consists of a cathode 1 which is a plane structure, laid out facing another plane structure forming the anode 2. The cathode 1 and the anode 2 are separated by a space in which the vacuum is formed. The cathode 1 comprises a glass substrate 3 on which the conducting level 4 is deposited in contact with the electron emitting probes 5. The conducting level 4 may be made in different ways. It comprises cathodic conductors usually associated with a resistive layer. The cathodic conductors may form various different geometries and particularly meshes. The conducting level 4 is covered by an insulating layer 6, for example made of silica, itself covered by a conducting layer 7. Holes 8 with a diameter of approximately 1 $\mu$m have been formed through layers 6 and 7 down to conducting level 4 to deposit probes 5 on this conducting level. The conducting layer 7 is used as an extraction grid for electrons emitted by probes 5. The anode 2 comprises a usually transparent substrate 9 covered by a usually transparent electrode 10, on which one or several luminescent materials or luminophores 11 are deposited.

We will now describe the operation of this screen. The anode 2 is increased to a positive potential of a few hundred volts relative to the probes 5. A positive potential of a few tens of volts with respect to the probes 5 is applied to the extraction grid 7. Electrons are then detached at probes 5 and are attracted by the anode 2. The trajectories of electrons are included within a cone with a half-angle at the summit equal to θ depending on the different parameters. The electron beam 12 is defocused by an amount that increases as the distance between the anode and the cathode increases. One of the methods of increasing the efficiency of the luminophores and therefore the brightness of the screen is to increase the acceleration voltage and therefore the potential difference between the anode and the cathode (typically between 1000 and 10000 V) which means further increasing the distance between the anode and the cathode in order to avoid the formation of an electric arc between these two electrodes.

If it is required to keep a good resolution on the anode, then the electron beam has to be refocused. This refocusing is typically done using an additional grid that may either be placed between the anode and the cathode (suspended grid) or placed on the cathode (integrated grid).

FIG. 2 illustrates the case in which the additional grid is located on the cathode. In order to make the drawing clearer, FIG. 2 repeats the example in FIG. 1 but for a single microprobe. An insulating layer 13 has been deposited on the extraction grid 7 and supports a metallic layer 14 acting as a focusing grid. Holes 15 with an appropriate diameter (typically between 8 and 10 $\mu$m) and concentric with holes 8, have been etched in layers 13 and 14. The insulating layer 13 is used to electrically isolate the extraction grid 7 and the additional grid 14. The additional grid is polarized with respect to the cathode in order to make the electron beam 16 have the shape shown in FIG. 2.

In a flat color screen, the luminophores are deposited on the anode in the form of parallel red—green—blue strips in sequence, etc. Color mixes must be avoided to achieve a good quality of the reproduced image. In order to achieve this, all electrons emitted by field effect elements to be aimed at a given color must arrive at the corresponding luminophore, and not adjacent luminophores. This result is achieved by the focusing phenomenon. Given the strip type structure of the luminophores, it is important that focusing should be done in the direction perpendicular to these strips in order to avoid color mixes. Similarly for a monochrome screen, it is useful to focus electrons on the luminophore, since this improves the screen resolution.

Moreover, for other structures comprising field effect sources, it is known that one or several other additional grids can be used, for example to protect the cathode from the electric field induced by the anode and thus avoid breakdown phenomena.

It is also known how to improve operation of microprobe screens by a particular addressing sequence that consists of planning regeneration phases during which the anode is brought to a sufficiently low potential so that it repulses electrons emitted by the microprobes.

This addressing sequence is described in the French patent entitled "Control process for a flat display screen" deposited on Jun. 8, 1995 by PIXTECH S.A., registration number 95 07017.

This addressing sequence has the advantage that it eliminates the phenomenon known as "color drift". The color drift phenomenon corresponds to a change in color that occurs on the display screen when a uniform color corresponding to one of the three primary colors (red, green, blue) is displayed for a relatively long time varying from a few seconds to a few minutes.

The anode does not attract electrons during a regeneration phase. Luminophores are then not excited and the regenerated screen areas have no influence on the image formed.

In the case of high voltage screens, the acceleration voltage applied to the anode may reach several kilovolts. Fast switching of the anode potential to a sufficiently low potential with respect to the cathode potential, for example a few volts, is then difficult to achieve. The circuits necessary to apply this type of switching are complex, expensive and bulky.

The invention does not have the disadvantages mentioned above.

PRESENTATION OF THE INVENTION

The invention relates to a control process for a structure with field effect elements, particularly for a cathode luminescent image display screen or for an X-ray tube, the structure comprising a cathode equipped with field effect elements, an anode, an extraction grid and an additional grid, the process comprising at least one phase in which electrons emitted by field effect elements are emitted to the anode and at least one regeneration phase during which the electrons emitted by the anode are not transmitted to the anode. The regeneration phase is implemented by application of an electron blocking potential on the additional grid, such that these electrons then return to the cathode. Return to the cathode means that electrons return to or near the cathode itself.

According to the invention, the regeneration phase is preferably independent of the emission phase concerning potential values applied to extraction grids and/or cathodic conductors during these phases. Thus, in the application to a display screen, the regeneration phase may be independent of the displayed image.

The invention also concerns a process for the display of images on a screen, characterized in that it uses a control process according to the invention as mentioned above.

The invention also relates to a process for the formation of images on an X-ray tube, characterized in that it implements a control process according to the invention like that mentioned above.

An advantage of the invention is that a high acceleration voltage (in other words potential difference between anode and cathode) can be used to attract electrons emitted by field effect elements while maintaining this voltage during regeneration phases. It is then no longer necessary to switch the anode potential, unlike the situation in prior art.

Other characteristics and advantages of the invention will become clear after reading a preferred embodiment with reference to the attached figures in which:

BRIEF DESCRIPTION OF THE FIGURES

FIGS. 3A, 3B, 3C, 3D show a time diagram according to the invention for voltages applied to the different elements of a structure with field effect elements during an addressing cycle;

The same marks denote the same elements in all figures.

DETAILED DESCRIPTION OF EMBODIMENTS OF THE INVENTION

Figure 1:
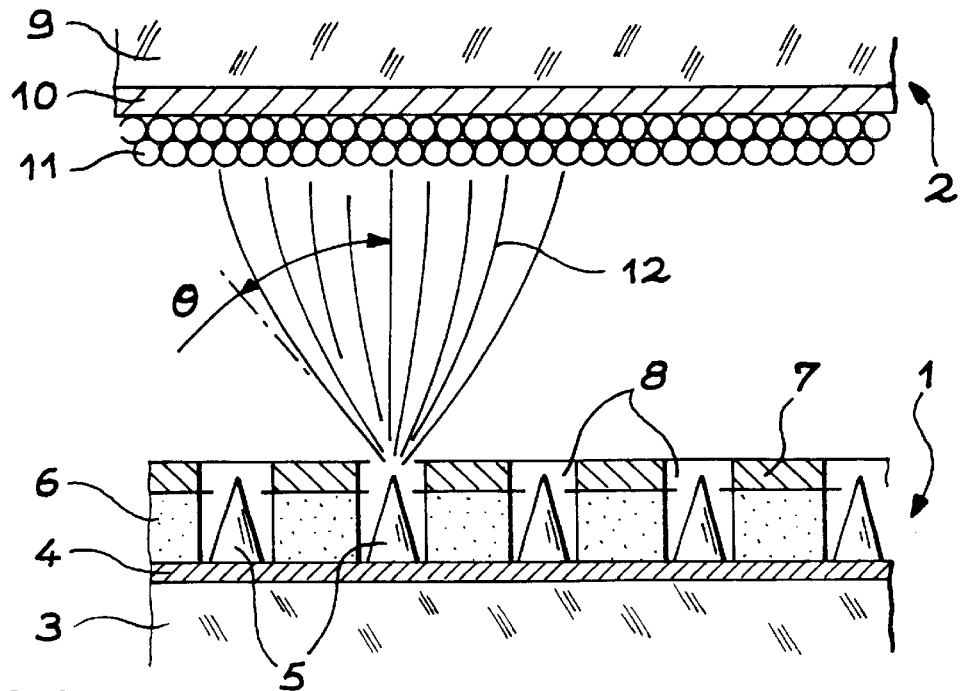
FIG. 1 shows a cross-sectional view of a display screen with microprobes according to a first embodiment in prior art.
Figure 2:
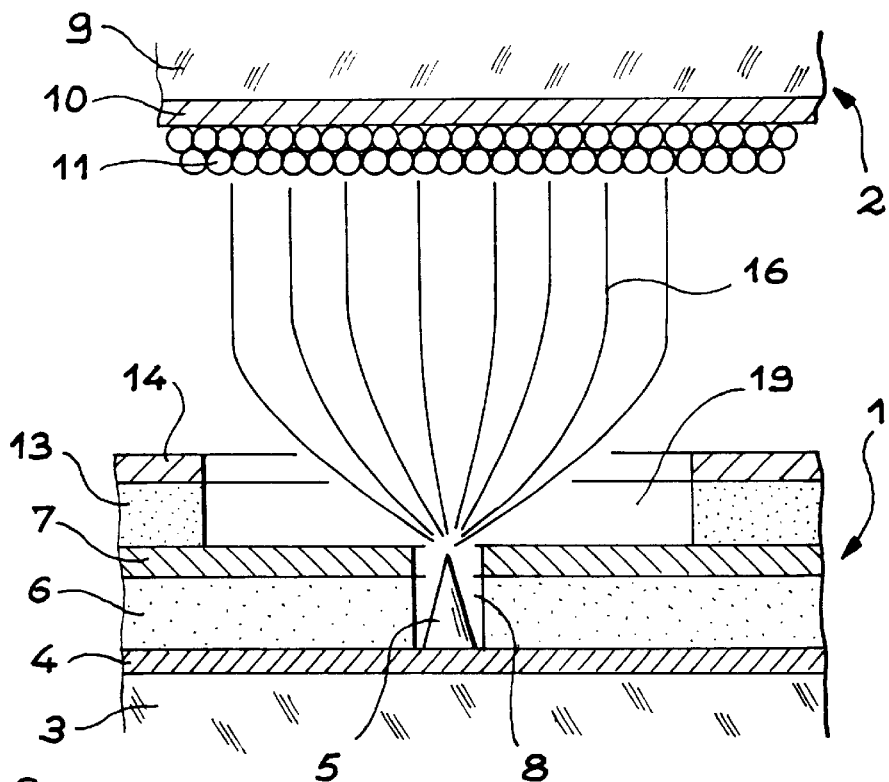
FIG. 2 shows a cross-sectional view of a display screen with microprobes according to a second embodiment in prior art.

FIGS. 1 and 2 were described above, and there is no point in describing them any further.

FIGS. 3A, 3B, 3C, 3D show a time diagram of voltages applied to the different elements of a structure with field effect elements during an addressing cycle, according to the invention. The addressing cycle includes an emission phase I and a regeneration phase II following the emission phase I.

The process according to the invention is applicable to a structure comprising at least four electrodes, namely an anode, a cathode, an extraction grid and an additional grid. Therefore as a non-restrictive example, the invention can be applied to a structure like that shown in FIG. 2.

According to the invention, a voltage is applied to the additional grid in order to create a potential barrier between the extraction grid and the anode during regeneration phases.

FIGS. 3A, 3B, 3C, 3D show the voltage Vc applied to a field effect element or a group of field effect elements, the voltage Va applied to the anode, the voltage Vg1 applied to the extraction grid and the voltage Vg2 applied to the additional grid, respectively, during an addressing cycle.

An addressing cycle is composed of an emission phase and a regeneration phase.

During the emission phase, an appropriate potential difference must be applied between the cathode and the extraction grid depending on whether or not an emission is required by the cathode. As a non-restrictive example, FIGS. 3A and 3C show that the voltage Vc is continuous (for example equal to 0 V) and the voltage Vg1 is in the form of a series of pulses between a high level VH (for example equal to 80 volt) and a low level VL (for example equal to 0 volt).

When no cathode emission is required, the voltage vc is modulated accordingly and for example changes to 40 volts. During the emission phase, the voltage of the anode is made continuous Va (see FIG. 3B) for example 3000 volts) and the voltage Vg2 applied to the additional grid (see FIG. 3D) is set to a potential enabling transmission of all or some electrons to the anode. For example, the voltage Vg2 is equal to 250 volts for a suspended grid.

During the regeneration phase, advantageously there is no need to switch the voltage Va from a high value to a sufficiently low value to repel electrons emitted by field effect elements. The voltage Va can then be fixed at a high continuous value of up to several kilovolts, identical to the voltage applied to the anode during the emission phase.

According to the invention, a potential barrier is created during the regeneration phase between the extraction grid and the anode by switching the voltage Vg2 applied to the additional grid between a nominal voltage VN enabling emitted electrons to reach the anode and a blocking voltage VB preventing the transfer of electrons that fall back at the cathode.

For example, the voltage VN may be equal to 250 volts and the voltage VB, for example equal to 0 volt, in the case of an intermediate grid suspended between the anode and the cathode. The difference in voltage to be switched is then corrected to a level that can easily be implemented (250 volts in the example described above).

During the regeneration phase, voltages applied to the cathode and the extraction grid must be such that electrons are emitted. In the example, Vc is shown with a voltage identical to the voltage of the emission phase and the voltage Vg1 is shown with a pulse amplitude identical to the pulse amplitude of the emission phase (the duration of Vg1 pulses may be different).

If there is to be no parasite emission of electrons towards the anode, the duration of the voltage pulse Vg1 must be equal to at least the duration of the regeneration phase, and beneficially smaller.

The additional grid may be monolithic or may be made in the form of conductors laid out in rows or columns and connected to the same potential. It may be made directly on the cathode (integrated grid), for example as in the embodiment shown in FIG. 2, or it may be installed as a separate element located between the extraction grid and the anode (suspended grid).

According to the invention, the additional grid enables electron transfers except for during the regeneration phases.

Advantageously, the additional grid may then be increased to a voltage outside the electron emission phases and furthermore, in some applications for example such as applications to flat screens, causes focusing of the electrons (see FIG. 2 for a non-restrictive example). The focusing voltage may then be applied throughout and even beyond the duration of the emission phase.

There is then an alternation of phases of electron bombardments focused on the anode and electron blockages during which emitted electrons drop to the cathode.

Similarly in the emission phases, the additional grid is preferably increased to a voltage which can protect the cathode from the anode field in some applications, for example such as application to X-ray tubes.

Advantageously, the invention can be used to make a means enabling blockage of electrons between the cathode and anode without making the structure more complex.

One possible means of applying cycles (emission and regeneration phases) to a structure comprising field effect elements arranged in the form of a matrix of rows and columns, is to:

- either apply an emission phase and a regeneration phase in sequence to each row scanned during a frame,
- or scan all rows or packets of rows in the frame by applying an emission phase in sequence and then applying the regeneration phase either in sequence or collectively,
- or scan all rows several times by applying an emission phase and then applying the regeneration phase to all rows either successively or collectively by packet or to the entire frame.

Thus for maximum efficiency, the regeneration phase will be applied sequentially and/or collectively to all cathode field effect elements.

The regeneration phase is idle time as far as use of the source is concerned. Therefore the duration of the regeneration phase needs to be minimized so that it does not excessively reduce the source usage time (and therefore the brightness in the case of a display application). In practice, the regeneration phase may be equal to 5 to 10% of the duration of the emission phase.

The process according to the invention is applicable to all known types of field effect element structure provided with an additional grid.

As already mentioned, the process according to the invention may for example be applied to an integrated structure like that described in FIG. 2. In this case, a potential barrier is created between the additional grid and the anode by applying a voltage very much lower than the voltage to be applied for refocusing and the polarization voltage for field effect elements to the additional grid. The electrons emitted drop back to the cathode.

Another example embodiment of the invention applies to the case in which an additional grid is inserted between the cathode and the anode as described in U.S. Pat No. 5,543,691. In this case, a potential barrier is created in the plane of the intermediate grid that cannot be crossed by the emitted electrons, by applying a voltage less than the voltage of the extraction grid, and preferably less than or equal to the polarization voltage of the field effect elements, to the additional grid.

What is claimed is:

1. Control process for a structure with field effect elements, the structure comprising a cathode equipped with field effect elements, an anode, an extraction grid and an additional grid, the process comprising at least one phase in which electrons are emitted to the anode by field effect elements, and at least one regeneration phase during which the electrons output from the elements are not transmitted to the anode, characterized in that the regeneration phase is implemented by applying an electron blocking voltage (VB) to the additional grid such that electrons drop back to the cathode.

2. Process according to claim 1, characterized in that a focusing voltage is applied to the additional grid, during an electron emission phase.

3. Process according to claim 1, characterized in that a voltage intended to protect the cathode from the anode field is applied to the additional grid, during an electron emission phase.

4. Process according to claim 1, characterized in that the control process comprises at least one addressing cycle, each cycle comprising a regeneration phase (II) that follows an emission phase (I) or conversely.

5. Process according to claim 4, characterized in that the regeneration phase is applied sequentially and/or collectively to all field effect elements of the structure.

6. Process according to claim 5, characterized in that the structure comprises field effect elements arranged in the form of a matrix of rows and columns, and it is possible to:

- either apply an emission phase and a regeneration phase in sequence to each row scanned during a frame,
- or scan all rows or packets of rows in the frame by applying an emission phase in sequence and then applying the regeneration phase either in sequence or collectively,
- or scan all rows several times by applying an emission phase and then applying the regeneration phase to all rows either successively or collectively by packet or to the entire frame.

7. Process according to claim 1, characterized in that the voltage (Va) applied to the anode during the regeneration phase is identical to the voltage applied to the anode during the emission phase.

8. Image display process on screen, characterized in that it uses a process according to claim 1.

9. Process for formation of images on an X-ray tube, characterized in that it uses a process according to claim 1.

* * * * *